July 24, 1962

L. PÉRAS 3,045,284

CLOSED MOULDS FOR INITIALLY FLUID MATERIALS

Filed July 30, 1959

INVENTOR
LUCIEN PÉRAS

BY Stevens, Davis, Miller & Mosher

ATTORNEYS

United States Patent Office 3,045,284
Patented July 24, 1962

3,045,284
CLOSED MOULDS FOR INITIALLY FLUID MATERIALS
Lucien Péras, Billancourt, France, assignor to Regie Nationale des Usines Renault, Billancourt, France
Filed July 30, 1959, Ser. No. 830,602
Claims priority, application France August 14, 1958
5 Claims. (Cl. 18—34)

This invention relates to molds similar to a punch and die assembly that are fluid tight upon completion of the molding movement, that is at the end of the stroke of the movable number thereof. One of the component elements of the mold usually is provided with a cutting device adapted to sever or trim the excess material from the molded article. These molds may be heated and may also be provided with stops or motion limiting devices. The relative displacement of one member with respect to the other produces two effects which may take place in a single continuous operation or separately (moulding in two or more steps):

(1) The homogeneous distribution of the fluid portion of the moulded material throughout the mould cavity.

(2) The lateral closing of the punch-to-die interval for sealing the mould.

Either of these functions should be obtained in such a manner that any air trapped initially between the mould elements be forced out completely when the mould is definitely closed, in order to avoid such defects as bubbles, tears, &c. in the moulded piece.

The device constituting the subject-matter of this invention meets in a very satisfactory and reliable manner these requirements and consists essentially of a resilient, suitably shaped gasket associated in an appropriate manner with the peripheral cutter and with the stop or motion limiting system. This gasket device is adapted to keep within predetermined limits the edges of the piece to be moulded externally of the mould portion on which this piece has previously been laid (on a punch or die), thus avoiding the shifting of the solid material during the movement of the two mould elements toward each other.

This type of mould is used notably for moulding composite materials made of natural or synthetic mineral or vegetable fibres disposed in woven or otherwise assembled layers or sheets, on which a fluid resin is spread just before subjecting the piece to the action of pressure.

The accompanying drawing shows more or less diagrammatically the arrangement constituting the subject matter of this invention. While this drawing illustrates the preferred embodiment of my invention to the manufacture of thin concave forms, it will be readily understood by those skilled in the art that this invention is applicable as well to the manufacture of pieces having a variety of shapes.

Figure 1:
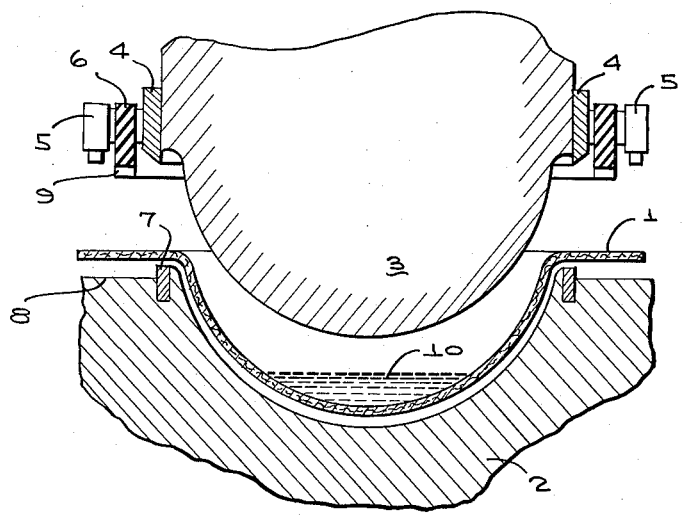
Figure 2:
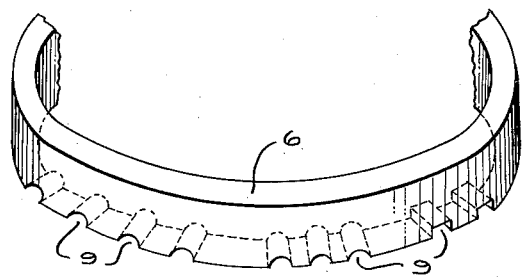

FIGURE 1 is a sectional view of a mould incorporating the essential features of this invention, and FIGURE 2 is a fragmentary view showing on a larger scale the resilient gasket utilized in this mould.

Referring to the drawing, a fibrous reinforcement 1 is laid in the cavity of the die 2 of a mould the punch 3 of which is provided with a cutter 4 and with an adjustable motion limit or stop device 5.

The resilient flexible gasket 6 is fitted on the periphery of the punch 3, externally of the cutter 4, whereby it will contact the reinforcement 1 of the piece to be moulded before the cutter 4 contacts the counter-blade 7, and serves to clamp the reinforcement on the portion 8 of the die, so that the reinforcement which normally tends to be carried along by the punch movement will be held against movement and thereby prevented from being forced to the bottom of the mould.

The gasket 6 is formed with recesses 9 of adequate shapes and areas, which permit the venting of any air from the gap between the punch and the die during the movement of these elements toward each other, so that the loss of pressure resulting therefrom be inversely proportional to their distance from the lowest point of the piece where the resin 10 accumulates before being distributed in the mould under the pressure exerted by the punch. Consequently, the arrangement may be such that the rate of movement of the resin introduced into the bottom of the mould and therefore of the die increases substantially in proportion to the distance to be covered, whereby the time necessary for it to attain the outer contour of the piece will be constant. At this time the movement of the punch and die toward each other will flatten the recesses 9 of the resilient gasket at the end of the stroke, thus rendering the mould fluid-tight without utilizing the cutters to this end. If such cutters are provided, their only function is to slightly trim the piece to its final contour.

The gasket may be made of any material having a sufficient resiliency (plastics, elastomers of the "butadiene-acrylonitrile" type, polyisobutilene, isoprene, etc.) as a function of the moulding requirements such as resistance to temperature, to resin solvents, &c.

The advantages characterizing the device forming the subject-matter of this invention are as follows:

(1) The solid reinforcement is held against displacement during the movement of the punch and die toward each other, due to the clamping action exerted by the gasket.

(2) The homogeneous and uniform impregnation of the reinforcement by the complete distribution of the resin through the mould cavity resulting from the efficient and controlled release of air through the gasket recesses during the moulding stroke.

(3) The minimizing of waste of the liquid resin as the excess flows from the mould only after the mould cavity has been effectively filled with resin, substatnially at the end of the moulding stroke.

I claim:

1. A mould for moulding fluid materials such as resins and the like which are initially fluid and are shaped and hardened in the mould, comprising a die member and a punch member, said punch member fitting within said die member to form a cavity, means for limiting the relative motion of said punch member into said die member in the moulding stroke, and a resilient gasket surrounding said mould cavity and adapted to be pressed between said punch and die members at the end of the moulding stroke, said resilient sealing gasket being provided with vents therein for venting air entrapped within said mould during said moulding stroke, the cross-sectional area of said vents and their distribution about the gasket being adapted to control the escape of air from said cavity at a rate such that the material in the mould will reach all of said vents substantially simultaneously irrespective of the shape of the article being moulded, whereby the material being moulded completely fills the mould cavity.

2. The mould according to claim 1, wherein said gasket is adapted to effectively seal the space between said punch and die members at the end of the moulding stroke, the vents being at said end completely flattened and closed.

3. The mold according to claim 1 wherein the punch element is positioned above the die element and is adapted to descend vertically therein, a knife edge surrounding said punch element and mounted thereon interiorly of said gasket, said die member having the periphery thereof in the form of a counterblade, the respective positions of said blades and said gasket being such that upon descent of said punch element into said die element said gasket is fully compressed before said blades are brought into cooperating engagement.

4. The mould according to claim 1, wherein the cross-sectional area of said vents and their distribution about the gasket are such as to permit simultaneously through all vents the discharge of excess fluid material just prior to the completion of said moulding stroke.

5. A mould for moulding fluid materials such as resins and the like which are initially fluid and are shaped and hardened in the mould, comprising a die member having an opening at one end thereof and adapted to receive materials to be moulded therein, a punch member fitting within said die member to form a mould cavity, said punch and die members being mounted for relative movement in the moulding stroke, means to limit the relative motion of said members in the moulding stroke, means on said punch and die members to sever excess material from the formed article at the end of the moulding stroke, and a gasket of resilient sealing material mounted on said punch member peripherally thereof and adapted to effectively seal the space between said punch and die members at the end of the moulding stroke, said gasket being provided with vents therein about the periphery thereof for venting air entrapped within said mould during said moulding stroke, the cross-sectional area of said vents and their distribution about the gasket being adapted to control the escape of air from said cavity at a rate such that the material in the mould will reach all of said vents substantially simultaneously irrespective of the shape of the article being moulded whereby the material being moulded completely fills the mould cavity.

References Cited in the file of this patent

UNITED STATES PATENTS

| | | |
|---|---|---|
| 208,097 | House | Sept. 17, 1878 |
| 1,569,689 | Vanonni | Jan. 12, 1926 |
| 2,071,734 | Dempsey | Feb. 23, 1937 |
| 2,639,252 | Simon | May 19, 1953 |
| 2,668,328 | Porter | Feb. 9, 1954 |
| 2,962,764 | Trojanowski | Dec. 6, 1960 |

FOREIGN PATENTS

| | | |
|---|---|---|
| 1,171,290 | France | Sept. 29, 1958 |